(12) United States Patent
Cho et al.

(10) Patent No.: US 9,111,187 B2
(45) Date of Patent: Aug. 18, 2015

(54) CONTACTLESS CARD CLAMP CIRCUITS THAT COMPENSATE FOR REGULATOR REFERENCE VOLTAGE FLUCTUATIONS

(75) Inventors: Jong Pil Cho, Hwaseong-si (KR); Il Jong Song, Yongin-si (KR); Sang Hyo Lee, Seoul (KR)

(73) Assignee: Samsung Electronic Co., Ltd. (KR)

( * ) Notice: Subject to any disclaimer, the term of this patent is extended or adjusted under 35 U.S.C. 154(b) by 265 days.

(21) Appl. No.: 13/612,898

(22) Filed: Sep. 13, 2012

(65) Prior Publication Data

US 2013/0223116 A1 Aug. 29, 2013

(30) Foreign Application Priority Data

Feb. 28, 2012 (KR) .......................... 10-2012-0020301

(51) Int. Cl.
*H03K 5/08* (2006.01)
*G06K 19/07* (2006.01)

(52) U.S. Cl.
CPC ........ *G06K 19/0715* (2013.01); *G06K 19/0723* (2013.01)

(58) Field of Classification Search
USPC ........ 363/81, 82, 84, 125, 127; 323/312, 314, 323/117, 313, 315, 316, 317; 327/309, 310, 327/312, 313, 538, 539, 540, 541
See application file for complete search history.

(56) References Cited

U.S. PATENT DOCUMENTS

| 5,546,021 A | * | 8/1996 | Bizuneh et al. ................. 326/86 |
| 6,630,858 B1 | | 10/2003 | Takabayashi |
| 7,800,436 B2 | * | 9/2010 | Yamazaki ..................... 329/350 |
| 2005/0040885 A1 | * | 2/2005 | Hayashi ........................ 327/543 |

FOREIGN PATENT DOCUMENTS

| JP | 2005202721 A | 7/2005 |
| JP | 2010157096 A | 7/2010 |

* cited by examiner

*Primary Examiner* — Nguyen Tran
(74) *Attorney, Agent, or Firm* — Myers Bigel Sibley & Sajovec, P.A.

(57) ABSTRACT

A contactless card includes an inductive circuit configured to send and receive signals, a rectifier circuit coupled to the inductive circuit and configured to generate a DC voltage from an AC voltage generated by the inductive circuit, a clamp circuit configured to limit the DC voltage, a regulator circuit configured to regulate the DC voltage and a control circuit configured to selectively enable and disable the clamp circuit and the regulator circuit.

14 Claims, 7 Drawing Sheets

CONTACTLESS CARD CLAMP CIRCUITS THAT COMPENSATE FOR REGULATOR REFERENCE VOLTAGE FLUCTUATIONS

CROSS-REFERENCE TO RELATED APPLICATIONS

This application claims priority under 35 U.S.C. §119 to Korean Patent Application No. 10-2012-0020301, filed on Feb. 28, 2012 in the Korean Intellectual Property Office (KIPO), the entire contents of which are incorporated herein by reference.

BACKGROUND

Some embodiments of the inventive subject matter relate to circuits for devices such as contactless cards and, more particularly, to clamp circuits for devices such as contactless cards.

Contactless card systems, particularly smart card systems, use contactless information recognition technology. For example, a card reader recognizes a smart card in a distance of several centimeters using a radio frequency and transmits and receives information to and from the recognized smart card.

A contactless card typically has a unique identification (ID) number. A contactless card typically includes a central processing unit (CPU), a data memory, and an interface and performs contactless short-range communication with a card reader connected to a host computer.

Some conventional contactless cards generates an alternating current (AC) voltage from electromagnetic waves generated from the card reader based on electromagnetic induction of an antenna. A rectifier circuit included in the contactless card may convert the AC voltage to a direct current (DC) voltage. The DC voltage may be regulated by a regulator circuit. The stable voltage produced by the regulator circuit is provided as power for a logic circuit.

The intensity of electromagnetic waves between the card reader and the contactless card may vary with environment. In particular, when the electromagnetic waves generated from the card reader increase quickly in a short time, e.g., 1 μs, overshoot of an internal voltage of the contactless card may occur because a bandgap reference voltage and the regulator circuit in the contactless card have not settled.

SUMMARY

According to some embodiments of the inventive subject matter, a clamp circuit includes a voltage divider circuit configured to produce a plurality of voltages from a DC voltage, a clamp start signal generation circuit configured to generate a reference current based on the plurality of voltages and generate a clamp start signal responsive to the reference current and a shunt circuit configured to limit a magnitude of the DC voltage responsive to the clamp start signal.

The clamp start signal generation circuit may include a reference current generation circuit configured to generate the reference current based on a first voltage of the plurality of voltages and a current-to-voltage conversion circuit configured to generate the clamp start signal responsive to the reference current and a second voltage of the plurality of voltages.

The clamp circuit may further include a NOR gate circuit configured to perform a NOR operation on the clamp start signal and a control signal to generate an output signal and the first shunt circuit may be configured to limit the magnitude of the DC voltage responsive to the output signal.

In some embodiments, the shunt circuit may include a first shunt circuit configured to limit the magnitude of the DC voltage responsive to the clamp start signal and a second shunt circuit configured to limit the magnitude of the DC voltage in response to a node voltage of the first shunt circuit.

In further embodiments of the inventive subject matter, an apparatus includes a rectifier configured to generate a DC voltage from an AC voltage, a reference voltage generator configured to generate a reference voltage, a clamp circuit configured to limit a magnitude of the DC voltage, a regulator circuit configured to regulate the DC voltage and a control circuit configured to control the clamp circuit and the regulator circuit based on a magnitude of the reference voltage. The control circuit may be configured to enable the regulator circuit when the reference voltage is greater than a threshold voltage and to disable the clamp circuit responsive to expiration of a time interval following enabling of the regulator circuit. The apparatus may further include a buffer circuit configured to buffer the DC voltage and the clamp circuit and/or the regulator circuit may be coupled to the buffer circuit.

In some embodiments, the clamp circuit may include a voltage divider circuit configured to produce a plurality of voltages from the DC voltage, a clamp start signal generation circuit configured to generate a reference current based on the plurality of voltages and to generate a clamp start signal responsive to the reference current, and a shunt circuit configured to limit a magnitude of the DC voltage responsive to the clamp start signal. The clamp start signal generation circuit may include a reference current generation circuit configured to generate the reference current based on a first voltage of the plurality of voltages and a current-to-voltage conversion circuit configured to generate the clamp start signal responsive to the reference current based on a magnitude of a second voltage of the plurality of voltages. The clamp circuit may further include a NOR gate configured to perform a NOR operation on the clamp start signal and a control signal output from the controller to produce and the shunt circuit may be configured to limit the magnitude of the DC voltage responsive to an output signal of the NOR gate.

In some embodiments, the clamp circuit may include a first shunt circuit configured to limit the magnitude of the DC voltage responsive to the clamp start signal and a second shunt circuit configured to limit the magnitude of the DC voltage responsive to a node voltage of the first shunt circuit.

Further embodiments provide a contactless card including an inductive circuit configured to send and receive signals, a rectifier circuit coupled to the inductive circuit and configured to generate a DC voltage from an AC voltage generated by the inductive circuit, a clamp circuit configured to limit the DC voltage, a regulator circuit configured to regulate the DC voltage and a control circuit configured to selectively enable and disable the clamp circuit and the regulator circuit. The contactless card may further include a reference voltage generator circuit configured to generate a reference voltage. The regulator circuit may be configured to regulate the DC voltage responsive to the reference voltage and the control circuit may be configured to selectively enable and disable the clamp circuit and the regulator circuit responsive to the reference voltage. In particular, the control circuit may be configured to disable the regulator circuit and enable the clamp circuit when the DC voltage is less than a threshold voltage and to enable the regulator circuit and disable the clamp circuit when the DC voltage is greater than the threshold voltage.

In some embodiments, the clamp circuit may include a clamp start signal generator circuit configured to generate a clamp start signal responsive to the DC voltage and a shunt circuit configured to limit the DC voltage responsive to the clamp start signal. The shunt circuit may include a first shunt circuit configured to limit the DC voltage responsive to the clamp start signal and a second shunt circuit configured to limit the DC voltage responsive to a voltage at an internal node of the first shunt circuit. The contactless card may further include a logic circuit configured to receive the DC voltage.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTIONS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
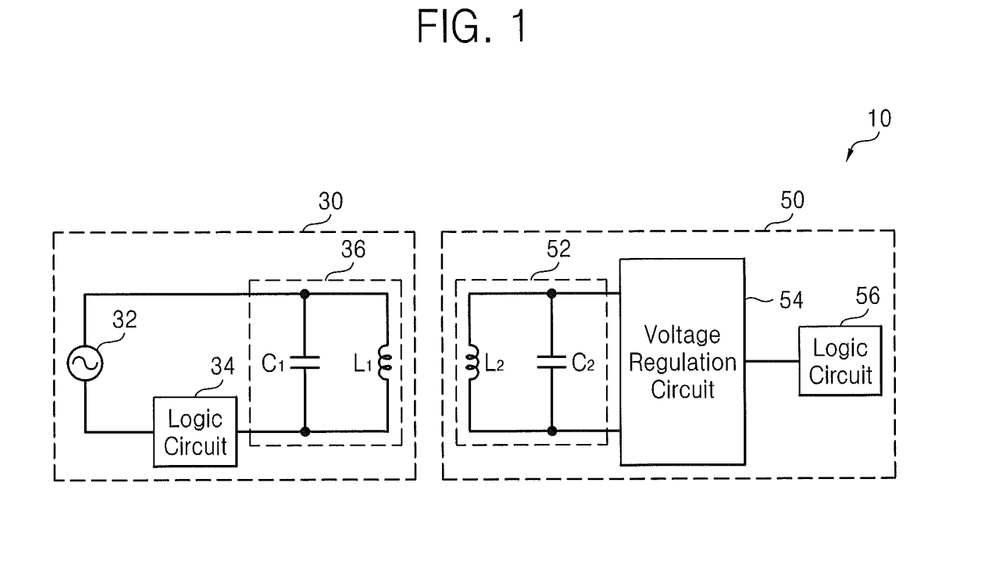
FIG. 1 is a block diagram of a contactless card system according to some embodiments of the inventive subject matter.

FIG. 1 is a block diagram of a contactless card system 10 according to some embodiments of the inventive subject matter. The contactless card system 10 includes a card reader 30 and a contactless card 50.

The card reader 30 emits electromagnetic waves, thereby supplying power to the contactless card 50. The card reader 30 may also communicate with the contactless card 50.

The card reader 30 includes a power supply 32, a logic circuit 34, and a resonator circuit 36. The power supply 32 provides power for circuitry of the card reader 30. The power supply 32 may be an alternating current (AC) power supply. The logic circuit 34 processes data to be transmitted to the contactless card 50 and data received from the contactless card 50. The resonator circuit 36 emits energy to provide power for the operation of the contactless card 50 and to transmit and receive data to and from the contactless card 50 using electromagnetic waves. The resonator circuit 36 may receive electromagnetic waves emitted by the contactless card 50. The resonator circuit 36 may include a first capacitor C1 and a first inductor L1 connected in parallel. The resonator circuit 36 may function as an antenna.

The contactless card 50 receives electromagnetic waves emitted from the card reader 30, performs data processing on the electromagnetic waves, and then emits the electromagnetic waves to the card reader 30. The contactless card 50 includes an inductive circuit 52, a voltage regulator circuit 54, and a logic circuit 56.

The inductive circuit 52 may receive electromagnetic waves emitted from the card reader 30 and may emit electromagnetic waves to the card reader 30. The inductive circuit 52 may induce voltage from the electromagnetic waves received from the card reader 30. The inductive circuit 52 may include a resonator circuit in which a second inductor L2 and a second capacitor C2 are connected in parallel to each other. The inductive circuit 52 may function as an antenna.

The voltage regulator circuit 54 rectifies an AC voltage to produce a rectified direct current (DC) voltage and produces a magnitude-limited DC voltage or a regulated DC voltage from the rectified DC voltage. The voltage regulator circuit 54 outputs the magnitude-limited DC voltage or the regulated DC voltage to the logic circuit 56.

The logic circuit 56 receives the magnitude-limited DC voltage or the regulated DC voltage from the voltage regulator circuit 54 and processes data received or to be transmitted through the inductive circuit 52.

Figure 2:
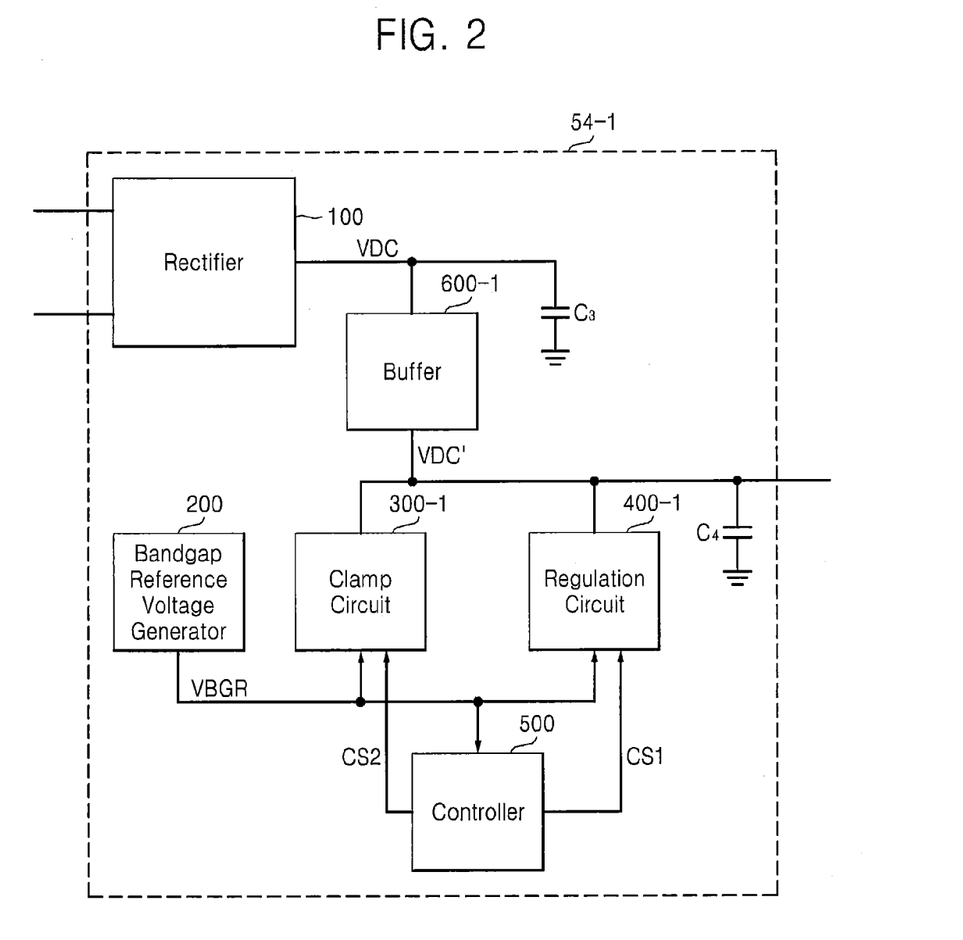
FIG. 2 is a block diagram of a voltage regulator circuit according to some embodiments of the inventive subject matter.
Figure 3:
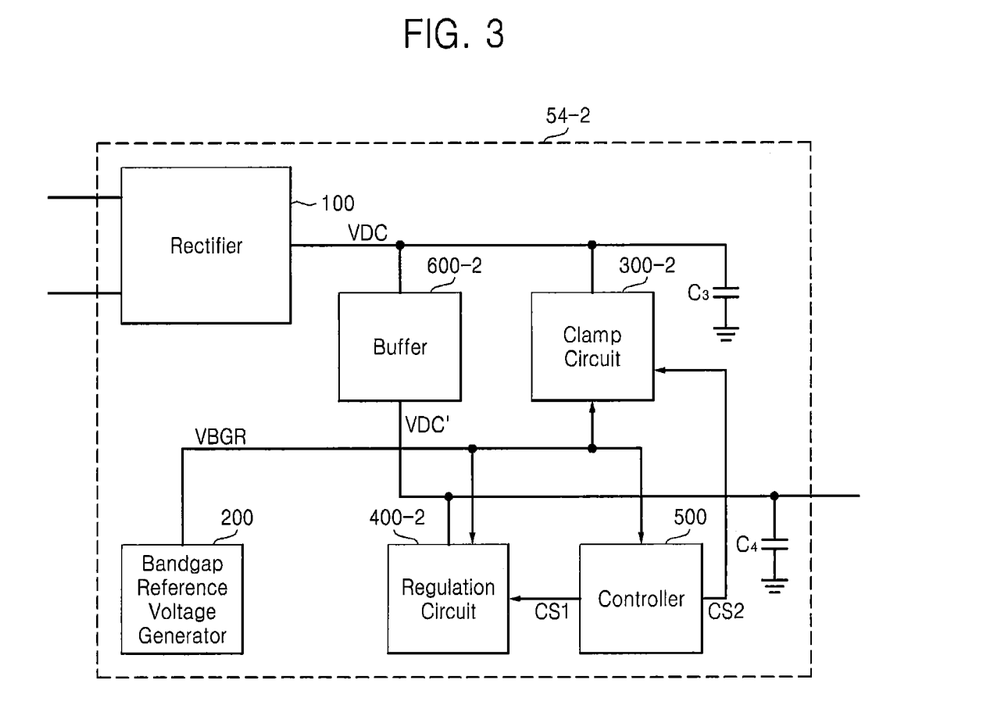
FIG. 3 is a block diagram of a voltage regulator circuit according to other embodiments of the inventive subject matter.

FIG. 2 is a block diagram of a voltage regulator circuit 54-1 according to some embodiments of the inventive subject matter. FIG. 3 is a block diagram of a voltage regulator circuit 54-2 according to other embodiments of the inventive subject matter.

Referring to FIGS. 1 through 3, the voltage regulator circuit 54-1 or 54-2 (generically denoted by reference numeral 54 in FIG. 1) includes a rectifier circuit 100, a reference voltage generator circuit 200, a clamp circuit 300-1, 300-2, a regulator circuit 400-1, 400-2, and a controller circuit 500-1, 500-2.

The rectifier circuit 100 rectifies an AC voltage output from the inductive circuit 52 to produce a DC voltage VDC. The reference voltage generator circuit 200 generates a reference voltage VBGR. The reference voltage generator circuit 200 may be a bandgap reference voltage generator. The reference voltage VBGR ramps up or down when the contactless card 50 starts to operate, and then when it reaches a predetermined level not influenced by external environments, it remains at the predetermined level.

The clamp circuit 300-1, 300-2 limits or clamps the magnitude of the DC voltage VDC output from the rectifier circuit 100. The clamp circuit 300-1, 300-2 limits overshoot of the DC voltage VDC by shunting current. In detail, the clamp circuit 300-1, 300-2 creates a current path between the output of the rectifier circuit 100 and a ground to limit or clamp the magnitude of the DC voltage VDC.

The regulator circuit 400-1, 400-2 regulates a DC voltage VDC'. The regulator circuit 400-1, 400-2 compares the reference voltage VBGR output from the reference voltage generator circuits 200 to the DC voltage VDC' and controls a current path according to the comparison, thereby regulating the DC voltage VDC'.

The controller circuit 500-1, 500-2 controls the clamp circuit 300-1, 300-2 and the regulator circuit 400-1, 400-2 according to the magnitude of the reference voltage VBGR. In detail, at the beginning of the operation of the contactless card 50, the magnitude of the reference voltage VBGR is too small to enable the regulator circuit 400-1, 400-2 to operate normally. Accordingly, when the reference voltage VBGR is lower than a threshold voltage (Vthd in FIG. 7), the controller circuit 500-1, 500-2 may only activate the clamp circuit 300-1, 300-2. At this time, the threshold voltage Vthd may be set to a predetermined level lower than a target voltage of the voltage regulator circuit 54.

When the reference voltage VBGR ramps up to at least the threshold voltage Vthd, the regulator circuit 400-1, 400-2 is able to operate normally. Accordingly, the controller circuit 500-1, 500-2 outputs a first control signal CS1 to the regulator circuit 400-1, 400-2 to enable the regulator circuit 400-1, 400-2.

When the regulator circuit 400-1, 400-2 operates normally, the clamp circuit 300-1, 300-2 does not need to operate. Accordingly, the controller circuit 500-1, 500-2 outputs a second control signal CS2 for disabling the clamp circuit 300-1, 300-2 a predetermined period of time ("td" in FIG. 7) after the first control signal CS1 has been output. The DC voltage VDC whose magnitude has been limited by the clamp circuit 300-1, 300-2 or that has been regulated by the regulator circuit 400-1, 400-2 is provided to the logic circuit 56.

The voltage regulator circuit 54 may also include a buffer 600-1, 600-2. The buffer 600-1, 600-2 buffers the DC voltage VDC. The buffer 600-1, 600-2 may perform a regulation function.

Referring to FIG. 2, the buffer 600-1 may receive and buffer the DC voltage VDC output from the rectifier circuit 100 and output a buffered DC voltage VDC' to the clamp circuit 300-1 and the regulator circuit 400-1. The clamp circuit 300-1 and the regulator circuit 400-1 receive the buffered DC voltage VDC' from the buffer 600-1. The clamp circuit 300-1 may limit the magnitude of the buffered DC voltage VDC'. The regulator circuit 400-1 may regulate the buffered DC voltage VDC'.

Referring to FIG. 3, the buffer 600-2 may receive and buffer the DC voltage VDC output from the rectifier circuit 100, which is limited by the claim circuit 300-2. The buffer 600-2 outputs a buffered DC voltage VDC' to the regulator circuit 400-2. The regulator circuit 400-2 may receive the buffered DC voltage VDC' from the buffer 600-1 and regulate the buffered DC voltage VDC'.

Referring to FIG. 1, the voltage regulator circuit 54 may also include a third capacitor C3 connected between the power line of the DC voltage VDC and the ground and a fourth capacitor C4 connected between a power line of the buffered DC voltage VDC' and the ground. The third capacitor C3 may reduce ripple in the DC voltage VDC. The fourth capacitor C3 may reduce ripple in the buffered DC voltage VDC'. In other words, the third and fourth capacitors C3 and C4 may function as a low-pass filter.

Figure 4:
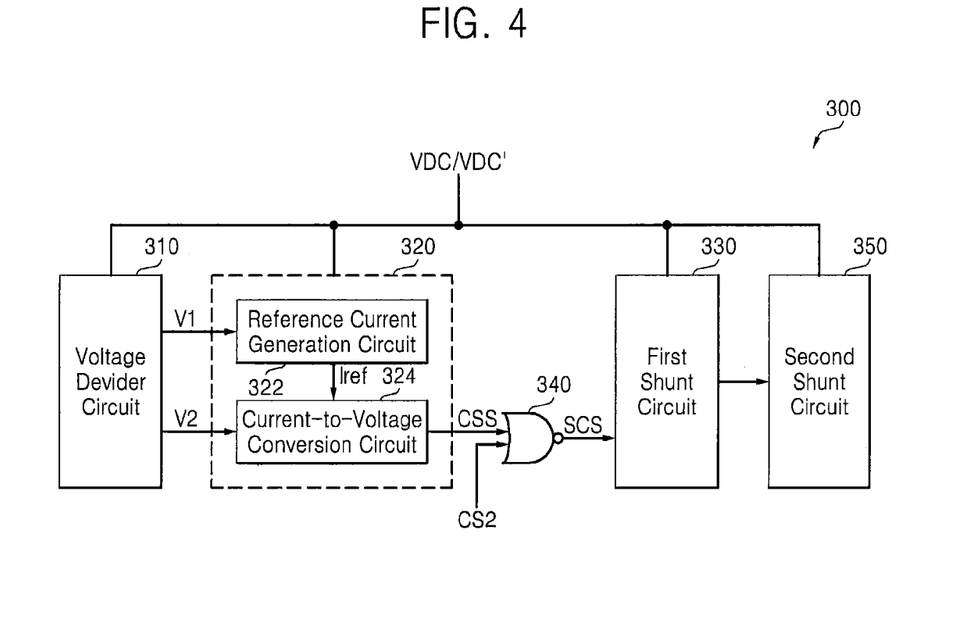
FIG. 4 is a block diagram of a clamp circuit illustrated in FIG. 2 or 3.

FIG. 4 is a block diagram of the clamp circuit 300 (e.g., corresponding to clamp circuits 300-1, 300-2 of FIGS. 2 and 3). Referring to FIGS. 1 through 4, the clamp circuit 300 includes a voltage divider circuit 310, a clamp start signal generation circuit 320, and a first shunt circuit 330.

The voltage divider circuit 310 divides the DC voltage VDC or VDC' output from the rectifier circuit 100 and outputs a plurality of voltages V1 and V2. The voltage divider circuit 310 may include a plurality of resistors connected in series between the power line of the DC voltage VDC or VDC' and the ground. Each of the resistors may have a resistance value determined considering the threshold voltage of metal oxide semiconductor (MOS) transistors included in the clamp start signal generation circuit 320. Alternatively, the voltage divider circuit 310 may include a plurality of diodes connected in series between the power line of the DC voltage VDC or VDC' and the ground.

The voltage divider circuit 310 may be implemented by a plurality of resistors or diodes connected in series, but the inventive subject matter is not restricted to those embodiments.

The clamp start signal generation circuit 320 generates a reference current Iref based on the first voltage V1 among the plurality of voltages V1 and V2 and converts the reference current Iref into a clamp start signal CSS, which is a voltage signal, based on the second voltage V2 among the plurality of voltages V1 and V2.

The clamp start signal generation circuit 320 includes a reference current generation circuit 322 and a current-to-voltage conversion circuit 324. The reference current generation circuit 322 generates the reference current Iref based on the first voltage V1. The current-to-voltage conversion circuit 324 converts the reference current Iref into the clamp start signal CSS according to the magnitude of the second voltage V2. The current-to-voltage conversion circuit 324 may convert the reference current Iref into the clamp start signal CSS when the second voltage V2 has at least a predetermined level.

The first shunt circuit 330 limits the magnitude of the DC voltage VDC or VDC' in response to the clamp start signal CSS. In other words, the clamp start signal CSS may be directly input to the first shunt circuit 330. In detail, the first shunt circuit 330 may create a first current path (CP1 in FIG. 6) between the power line of the DC voltage VDC or VDC' and the ground to limit the magnitude of the DC voltage VDC or VDC'.

The clamp circuit 300 may also include a NOR gate 340. The NOR gate 340 may perform a NOR operation on the clamp start signal CSS output from the clamp start signal generation circuit 320 and the first control signal CS1 output from the controller circuit 500.

The first shunt circuit 330 may limit the magnitude of the DC voltage VDC or VDC' in response to an output signal SCS of the NOR gate 340.

The clamp circuit 300 may also include a second shunt circuit 350. The second shunt circuit 350 may limit the magnitude of the DC voltage VDC or VDC' in response to a node voltage of the first shunt circuit 330. In detail, the second shunt circuit 350 may limit the magnitude of the DC voltage VDC or VDC' by creating a second current path (CP2 in FIG. 6) between the power line of the DC voltage VDC or VDC' and the ground. Accordingly, when the DC voltage VDC or VDC' overshoot too much to be controlled only with the first current path CP1, the clamp circuit 300 may limit the magnitude of the DC voltage VDC or VDC' using the second current path CP2.

Figure 5:
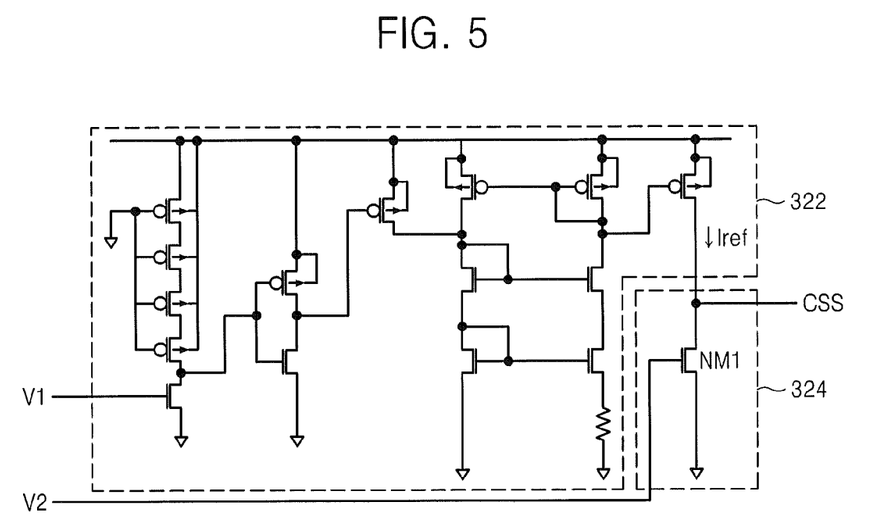
FIG. 5 is a circuit diagram of a clamp start signal generation circuit illustrated in FIG. 4 according to some embodiments of the inventive subject matter.

FIG. 5 is a circuit diagram of the clamp start signal generation circuit 320 illustrated in FIG. 4 according to some embodiments of the inventive subject matter. Referring to FIGS. 1 through 5, the reference current generation circuit 322 may be implemented by a beta-multiplier.

The reference current generation circuit 322 is set up in response to the first voltage V1 and outputs the reference current Iref. The current-to-voltage conversion circuit 324 includes a first n-channel MOS (NMOS) transistor NM1. The first NMOS transistor NM1 controls a current path of the reference current Iref in response to the second voltage V2, thereby outputting the clamp start signal CSS based on the second voltage V2.

In detail, when the second voltage V2 is lower than the threshold voltage of the first NMOS transistor NM1, the first NMOS transistor NM1 is turned off. However, when the second voltage V2 is equal to or higher than the threshold voltage of the first NMOS transistor NM1, the first NMOS transistor NM1 is turned on. Consequently, the current-to-voltage conversion circuit 324 outputs the clamp start signal CSS based on the reference current Iref and the turn-on resistance of the first NMOS transistor NM1.

Figure 6:
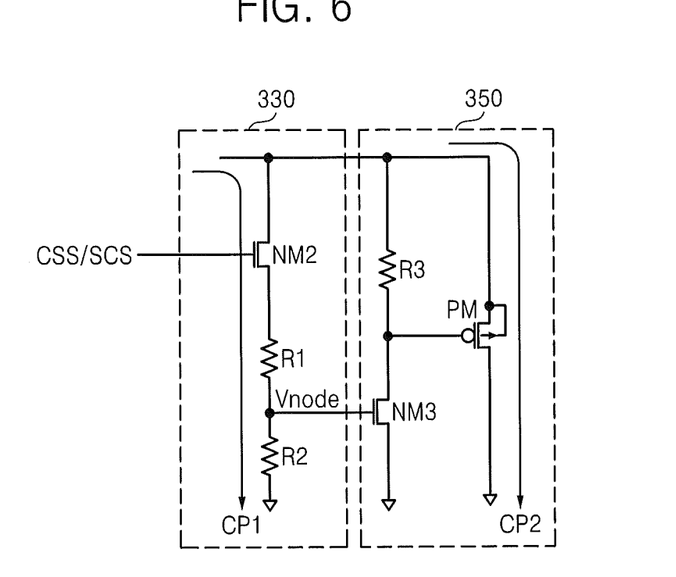
FIG. 6 is a circuit diagram of a first shunt circuit and a second shunt circuit illustrated in FIG. 4 according to some embodiments of the inventive subject matter.

FIG. 6 is a circuit diagram of the first shunt circuit 330 and the second shunt circuit 350 illustrated in FIG. 4 according to some embodiments of the inventive subject matter. Referring to FIGS. 1 through 6, the first shunt circuit 330 includes a second NMOS transistor NM2 and a plurality of resistors R1 and R2, which are connected in series between the power line of the DC voltage VDC or VDC' and the ground. The second shunt circuit 350 may include a third NMOS transistor NM3, a p-channel MOS (PMOS) transistor PM, and a resistor R3, which are connected in series between the power line and the ground.

The first shunt circuit 330 may perform a shunt operation in response to the clamp start signal CSS output from the clamp start signal generation circuit 320 or the output signal SCS of the NOR gate 340. In detail, when the clamp start signal CSS output from the clamp start signal generation circuit 320 or the output signal SCS of the NOR gate 340 is equal to or higher than the threshold voltage of the second NMOS transistor NM2, the second NMOS transistor NM2 forms the first current path CP1 between the power line and the ground, and therefore the magnitude of amplitude of the DC voltage VDC or VDC' is limited.

The first shunt circuit 330 may divide the DC voltage VDC or VDC' using the resistors R1 and R2 and output one of the divided voltages as a node voltage Vnode. The second shunt circuit 350 may perform a shunt operation in response to the node voltage Vnode. In detail, when the node voltage Vnode is equal to or higher than the threshold voltage of the third NMOS transistor NM3, the third NMOS transistor NM3 forms the second current path CP2 between the power line and the ground, and therefore the magnitude of amplitude of the DC voltage VDC or VDC' is limited. The node voltage Vnode may be influenced by the magnitude of the DC voltage VDC or VDC'.

Figure 7:
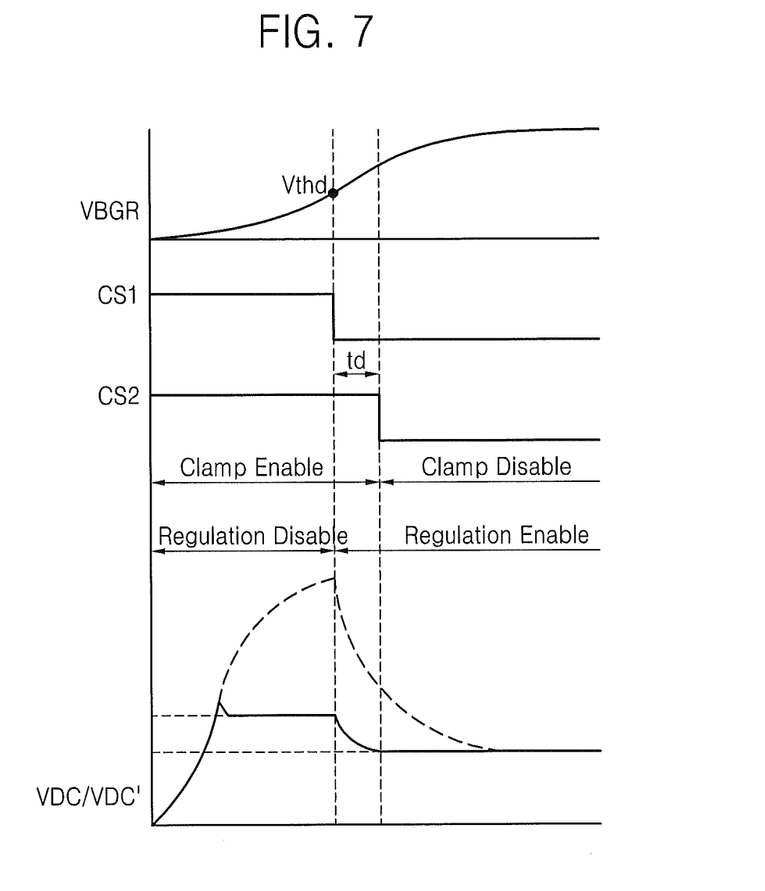
FIG. 7 is a timing chart showing the operation of the voltage regulator circuit illustrated in FIG. 1.

FIG. 7 is a timing chart showing the operation of the voltage regulator circuit 54 illustrated in FIG. 1. Referring to FIGS. 1 through 7, the reference voltage VBGR output from the reference voltage generator circuit 200 ramps up at the beginning of the operation of the voltage regulator circuit 54, and when the reference voltage VBGR reaches a predetermined level, it remains at the predetermined level without being influenced by external environments.

The regulator circuit 400 is not able to operate in a normal manner when the magnitude of the reference voltage VBGR is too small. The DC voltage VDC or VDC' changes along the dotted line in a voltage regulator circuit that does not include the clamp circuit 300. In detail, overshoot of the DC voltage VDC or VDC' may occur before the regulator circuit 400 operates normally.

The voltage regulator circuit 54 including the clamp circuit 300 limits the magnitude of the DC voltage VDC or VDC' using the clamp circuit 300 until the reference voltage VBGR reaches the predetermined level enabling the regulator circuit 400 to operate normally.

When the reference voltage VBGR reaches the predetermined level, the controller circuit 500 outputs the first control signal CS1 for enabling the regulator circuit 400. When the predetermined period of time "td" elapses from the output of the first control signal CS1, the controller circuit 500 outputs the second control signal CS2 for disabling the clamp circuit 300. Accordingly, the DC voltage VDC or VDC' may change along the solid line.

As described above, according to some embodiments of the inventive subject matter, a clamp circuit and devices including the same prevents the excessive increase, i.e., overshoot of an internal voltage of a contactless card before a bandgap reference voltage and a regulator circuit are set up, thereby preventing the internal elements of the contactless card from being broken and increasing the reliability of the contactless card.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:
1. A clamp circuit comprising:
   a voltage divider circuit configured to produce a plurality of voltages from a DC voltage;
   a reference current generation circuit configured to generate a reference current based on a first voltage of the plurality of voltages;

a current-to-voltage conversion circuit configured to convert the reference current into a clamp start signal responsive to the reference current and a second voltage of the plurality of voltages;

a logic gate circuit configured to perform a logic operation on the clamp start signal output from the current-to-voltage conversion circuit and a control signal received from a controller; and a shunt circuit configured to limit a magnitude of the DC voltage responsive to the clamp start signal.

2. The clamp circuit of claim 1, wherein the logic gate circuit is configured to perform a NOR operation on the clamp start signal and the control signal to generate an output signal and wherein the shunt circuit is configured to limit the magnitude of the DC voltage responsive to the output signal.

3. The clamp circuit of claim 1, wherein the shunt circuit comprises:

a first shunt circuit configured to limit the magnitude of the DC voltage responsive to the clamp start signal; and a second shunt circuit configured to limit the magnitude of the DC voltage in response to a node voltage of the first shunt circuit.

4. An apparatus comprising:

a rectifier configured to generate a DC voltage from an AC voltage;

a reference voltage generator configured to generate a reference voltage;

a clamp circuit configured to limit a magnitude of the DC voltage, wherein the clamp circuit further comprises:

a voltage divider circuit configured to produce a plurality of voltages from the DC voltage;

a reference current generation circuit configured to generate a reference current based on a first voltage of the plurality of voltages;

a current-to-voltage conversion circuit configured to convert the reference current into a clamp start signal responsive to the reference current and a second voltage of the plurality of voltages; and a shunt circuit configured to limit a magnitude of the DC voltage responsive to the clamp start signal;

a regulator circuit configured to generate a regulated DC voltage from the DC voltage; and a control circuit configured to control the clamp circuit and the regulator circuit based on a magnitude of the reference voltage, wherein the control circuit comprises a logic gate circuit configured to perform a logic operation on the clamp start signal output from the current-to-voltage conversion circuit and a control signal.

5. The apparatus of claim 4, wherein the control circuit is configured to enable the regulator circuit when the reference voltage is greater than a threshold voltage and to disable the clamp circuit responsive to expiration of a time interval following enabling of the regulator circuit.

6. The apparatus of claim 4, further comprising a buffer circuit configured to buffer the DC voltage and wherein the clamp circuit and/or the regulator circuit is coupled to the buffer circuit.

7. The apparatus of claim 4, wherein the control signal is a control signal corresponding to the output of the reference voltage generator, and wherein the shunt circuit is configured to limit the magnitude of the DC voltage further responsive to the control signal corresponding to the output of the reference voltage generator.

8. The apparatus of claim 4, wherein the shunt circuit comprises:

a first shunt circuit configured to limit the magnitude of the DC voltage responsive to the clamp start signal; and a second shunt circuit configured to limit the magnitude of the DC voltage responsive to a node voltage of the first shunt circuit.

9. A contactless card comprising the apparatus of claim 4.

10. The contactless card of claim 9, further comprising:

an inductive circuit configured to generate the AC voltage; and a logic circuit configured to receive the DC voltage.

11. The contactless card of claim 10, wherein the contactless card is a smart card.

12. The clamp circuit of claim 1, wherein the control signal is a control signal corresponding to the output of the reference voltage generator, and wherein the shunt circuit is configured to limit the magnitude of the DC voltage further responsive to the control signal corresponding to the output of a reference voltage generator.

13. The apparatus of claim 7, wherein the logic gate circuit further includes a NOR gate configured to perform a NOR operation on the clamp start signal and the control signal corresponding to the output of the reference voltage generator and wherein the shunt circuit is configured to limit the magnitude of the DC voltage responsive to an output signal of the NOR gate.

14. The apparatus of claim 7, wherein the control circuit is configured to control the clamp circuit by providing the control signal corresponding to the output of the reference voltage generator.

* * * * *